Dec. 29, 1925.
E. J. SWEETLAND
LIQUID GRAVITY INDICATOR
Filed Nov. 19, 1920
1,567,821
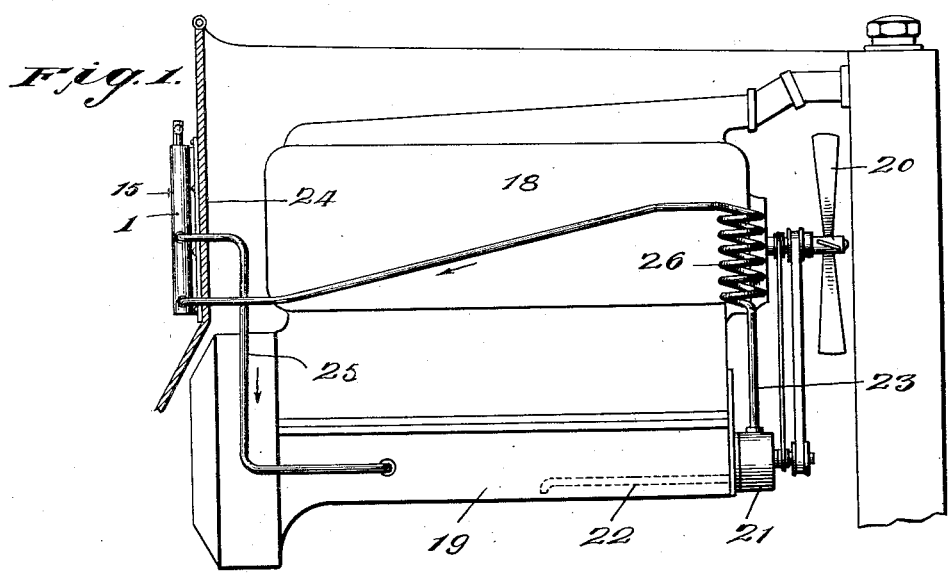
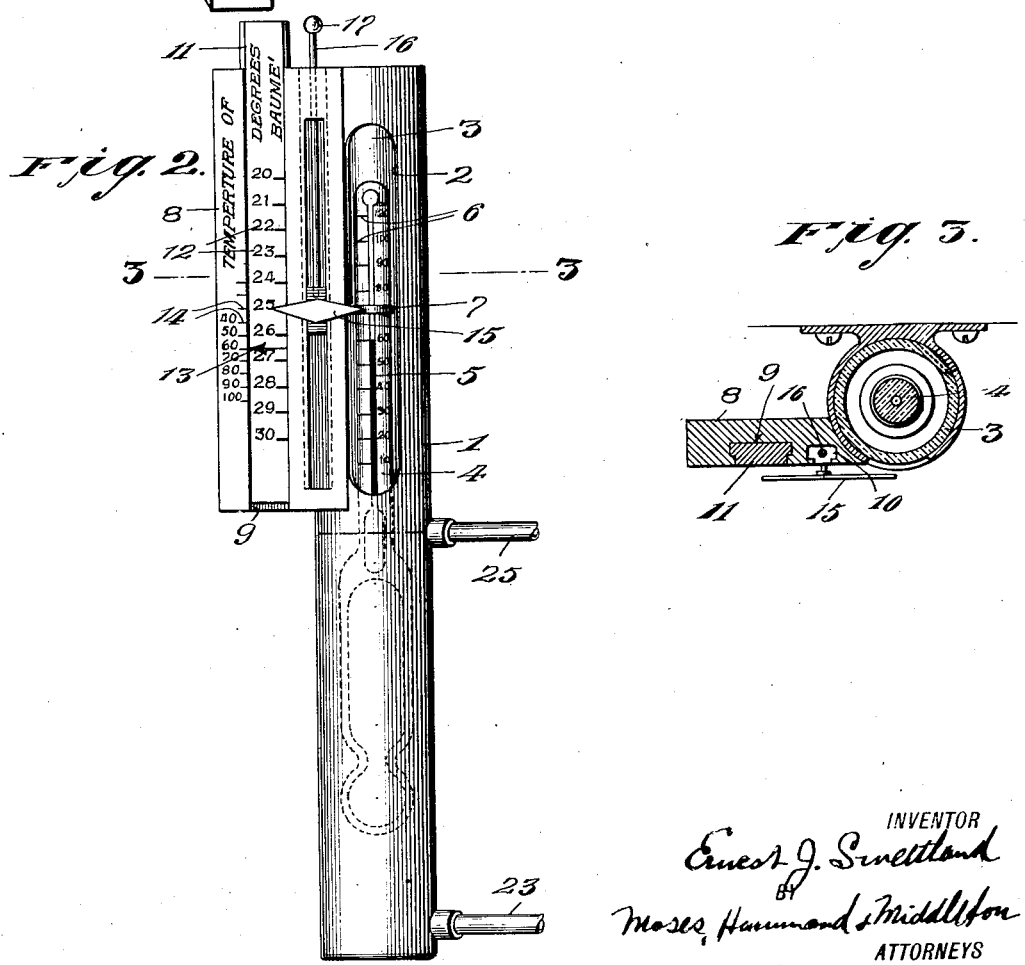
INVENTOR
Ernest J. Sweetland
BY
Moses, Hammond & Middleton
ATTORNEYS Patented Dec. 29, 1925.

1,567,821

UNITED STATES PATENT OFFICE.

ERNEST J. SWEETLAND, OF MONTCLAIR, NEW JERSEY.

LIQUID-GRAVITY INDICATOR.

Application filed November 19, 1920. Serial No. 425,041.

*To all whom it may concern:*

Be it known that I, ERNEST J. SWEETLAND, a citizen of the United States of America, residing in the town of Montclair, county of Essex, and State of New Jersey, have invented certain new and useful Improvements in Liquid-Gravity Indicators, of which the following is a specification.

This invention relates to improvements in liquid gravity indicators and is particularly adapted for use for determining the specific gravity of the lubricating oil in the crank cases of internal combustion engines of motor vehicles such as automobiles, aeroplanes, motor boats and the like.

In the operation of internal combustion engines, it is desirable that the lubricating oil should be of a specific gravity such that the lubrication of the several parts of the engine will be effected in a manner to insure that the engine will operate at a high efficiency. As a decrease or increase of the specific gravity of the oil below or above the desired specific gravity thereof will result in reducing the operating efficiency of the engine, it is desirable that the operator should be able, at any time, to ascertain the specific gravity of the lubricating oil within the crank case, in order that he may take the proper steps to insure that it will be as desired. If, for example, he finds that the oil within the crank case is too light, he may add a heavier oil thereto in sufficient quantity to form a mixture having the desired specific gravity, or if the oil is too heavy, he may then add a quantity of a lighter oil sufficient to accomplish the desired result.

In accordance with my invention I provide an instrument adapted to be mounted in any suitable place, such as upon the instrument board of the motor vehicle, where it can be observed by the driver and whereby he can ascertain readily the specific gravity of the lubricating oil within the crank case of the engine. This instrument will serve to keep the driver informed as to the condition of the lubricating oil and will also serve as an index as to the operation of the engine. If, for example, the instrument shows that the crank case oil is being constantly thinned or diluted during the operation of the engine, it would indicate to the driver that in all probability such dilution is due to the leakage of gasoline from the engine into the crank case, due to leaky piston rings or excessive use of the choker and the driver may then take steps to remedy the fault.

In the accompanying drawings forming part of this specification, wherein I have shown a preferred embodiment of my invention for the purpose of illustrating the principle thereof, Figure 1 is a side elevation of an internal combustion engine equipped with an instrument constructed in accordance with and embodying my invention, Figure 2 is a front view of the instrument, and Figure 3 is a sectional view taken on the line III—III of Figure 2.

Referring to Figures 2 and 3 of the drawings, the instrument is shown as comprising a chamber or casing 1, preferably formed of metal, having an opening 2 formed in the upper portion of the wall thereof. Mounted within the casing 1 and secured thereto to form a fluid tight joint therewith, is a transparent tubular member 3, preferably formed of glass, which registers with the opening 2 to form a window. Within the casing 1 is a combination hydrometer and thermometer 4 of any suitable type, having a fluid column 5, such as mercury, responsive to variations in temperature and a temperature scale 6. The scale for indicating the specific gravity of the liquid with which hydrometers are usually supplied, and from which the reading is taken at the level where the hydrometer floats in the liquid, is preferably omitted, as I prefer to take such reading at a point above the liquid level and in order to permit of this being done an indicating mark 7, which may be in the form of a ring, is provided at a suitable point upon the upper end of the hydrometer 4 from which mark the reading is obtained as hereinafter described.

At one side of the casing 1 and extending throughout the height of the opening 2 is a plate 8, preferably secured to the casing in any suitable manner or formed integral therewith, having two vertically-extending grooves 9 and 10 formed in its front surface. Within the groove 9 is mounted a slide 11 carrying a suitable scale 12 which, as shown, is graduated to read degrees Baumé, but which, of course, could be graduated to read specific gravities, or the like. The slide 11 is also provided with an indicating mark 13 adapted to co-operate with a correction temperature scale 14 upon the plate 8. Slidingly mounted within the groove 10 in the plate 8 is a double-ended pointer 15, adapted to register with the indicating mark 7 on the hydrometer, and with the scale 12 on the slide 11. The pointer may be raised and lowered by means of a rod 16 secured at its lower end to the pointer and provided at its upper end with a knob 17 or the like adapted to be grasped by the fingers.

Referring to Figure 1 wherein, for purposes of illustrating the operation of the instrument, I have shown the instrument operatively connected to the crank case of an internal combustion engine of an automobile, 18 indicates an internal combustion engine of any suitable type having a crank case 19 and provided with the usual fan 20 located in front of the radiator. Mounted upon the crank case, or upon the vehicle frame, is a suitable pump 21 which may be the pump usually employed in connection with forced-feed lubricating systems of the usual type, and which withdraws oil from the crank case 19 through the pipe 22. Communicating with the pump is an outflow pipe 23 which communicates with the lower end of the casing 1 of the instrument which is shown mounted upon the vehicle instrument board 24. An overflow pipe 25 leads from the casing 1 at a point below the opening 2, as clearly shown in Figure 2, to the crank case 19. In order to cool the oil before it is delivered within the instrument casing 1, a coil 26 of any suitable form is interposed in the pipe 23 and preferably positioned directly in back of the fan 20.

In operation the pump 21 maintains a continuous flow of oil from the crank case 19, through pipe 23 and coil 26 to the instrument casing 1, and through the pipe 25 back to the crank case. The pipe 23 and coil 26 are preferably of small diameter so as to permit only a very slow flow of oil into the casing, and the overflow pipe serves to maintain the oil at a constant level within the casing. The position of the hydrometer 4 within the casing will, of course, depend upon the specific gravity of the oil therein, and will vary as the specific gravity varies. To determine the specific gravity of the oil at any time, corrected to the desired temperature, it being of course understood that the correction temperature scale is so graduated as to accomplish the desired result, it is merely necessary to move the double-pointer 15 until the right hand end thereof registers with the indicating mark 7 on the hydrometer 4 and to move the slide 11 until the indicating mark 13 thereon registers with the mark on the temperature correction scale 14 corresponding to the temperature indicated by the fluid column 5 of the thermometer. When the slide 11 and double-pointer 15 are thus positioned the numeral of the scale 12 on the slide 11 with which the left-hand end of the pointer registers will indicate the specific gravity of the oil corrected to the desired temperature. As illustrated by way of example in Figure 2 the temperature of the oil, as indicated by the thermometer, is sixty degrees, the slide 11 has been set to cause the indicating mark 13 thereon to register with the sixty degree mark of the temperature correction scale 14, and the pointer 15 has been set with its right hand end registering with the indicating mark 7 on the hydrometer. Under these conditions the left-hand end of the pointer is shown in register with the mark on the scale 12 of the slide 11 designated by the numeral twenty-five, thus indicating that the oil has a specific gravity corresponding to twenty-five degrees Baumé.

While it is preferred to so construct the instrument that it may be corrected for temperature as shown and described, it is of course understood that it could be constructed to indicate simply the specific gravity of the oil within the casing. In such case, the slide 11 could be eliminated, the scale 12 being applied directly to the front of the plate 8, or the hydrometer could be supplied with the usual scale from which the desired reading is taken at the level where the hydrometer floats in the oil.

It is, of course, understood that the instrument is adapted for use other than for determining the specific gravity of oil in the crank cases of internal combustion engines, as shown.

While I have illustrated and described my invention in connection with a preferred embodiment thereof, it will be understood that I do not intend to limit myself to such specific embodiment, but that I intend to cover my invention broadly in whatever form its principle may be employed.

Having thus described my invention, I claim:

1. In combination with an internal combustion engine having a lubricating oil reservoir, means for circulating the oil, a chamber connected so as to receive oil continuously from said circulating means when the engine is in operation to return it to said reservoir, and to maintain a constant level of oil in the chamber; and means co-operating with said chamber for continuously indicating the specific gravity of the oil therein.

2. In combination with an internal combustion engine having a lubricating oil reservoir, means for circulating the oil, a chamber having a transparent portion, a pipe connecting said chamber with said oil circulating means, another pipe connecting said chamber to said reservoir and adapted to limit the height to which the oil can rise in said chamber, and a hydrometer within said casing visible thru the transparent portion of the latter for continuously indicating the specific gravity of the oil in said chamber.

3. In a combination with an internal combustion engine having a lubricating oil reservoir, a chamber having a transparent portion, means for causing a continuous flow of oil from said reservoir to and thru said chamber and back to said reservoir, a combined hydrometer and thermometer within said chamber having a temperature scale and an indicating mark observable thru said window, a fixed correction temperature scale associated with said chamber, a movable member associated with said chamber bearing a specific gravity scale and an indicating mark co-operating with said correction temperature scale, and a movable pointer adapted to co-operate with said specific gravity scale and with the indicating mark on the combined hydrometer and thermometer.

4. In combination with an internal combustion engine having a lubricating oil reservoir, a chamber, a hydrometer within said chamber, means for withdrawing oil from said reservoir and delivering it into said chamber and returning it to said reservoir, and a coil thru which the oil passes before it enters said chamber, said coil being located in the path of the air from the engine fan.

5. An instrument for determining the specific gravity of a liquid including a casing having a window in its upper portion and adapted to receive the liquid in its lower portion, a hydrometer within said casing bearing an indicating mark observable through said window, a specific gravity indicating scale, and a movable member adapted to co-operate with the indicating mark on said hydrometer and with said scale.

6. An instrument for determining the specific gravity of a liquid including a casing having a window in its upper portion and adapted to receive the liquid in its lower portion, a combined hydrometer and thermometer within said casing having a temperature scale and an indicating mark observable through said opening, a correction temperature scale, a movable member having an indicating mark cooperating with said correction temperature scale and a specific gravity indicating scale and a movable member cooperating with the indicating mark on said combined hydrometer and thermometer and with the specific gravity indicating scale on said first-named movable member.

In testimony whereof I have affixed my signature to this specification.

ERNEST J. SWEETLAND.